Dec. 20, 1966    C. L. HORNER    3,292,309
ADJUSTABLE BLIND ASSEMBLY

Filed May 25, 1964    3 Sheets-Sheet 1

INVENTOR.
CARL L. HORNER
BY
*William P. Sewald*
ATTORNEY

Dec. 20, 1966  C. L. HORNER  3,292,309
ADJUSTABLE BLIND ASSEMBLY
Filed May 25, 1964  3 Sheets-Sheet 2
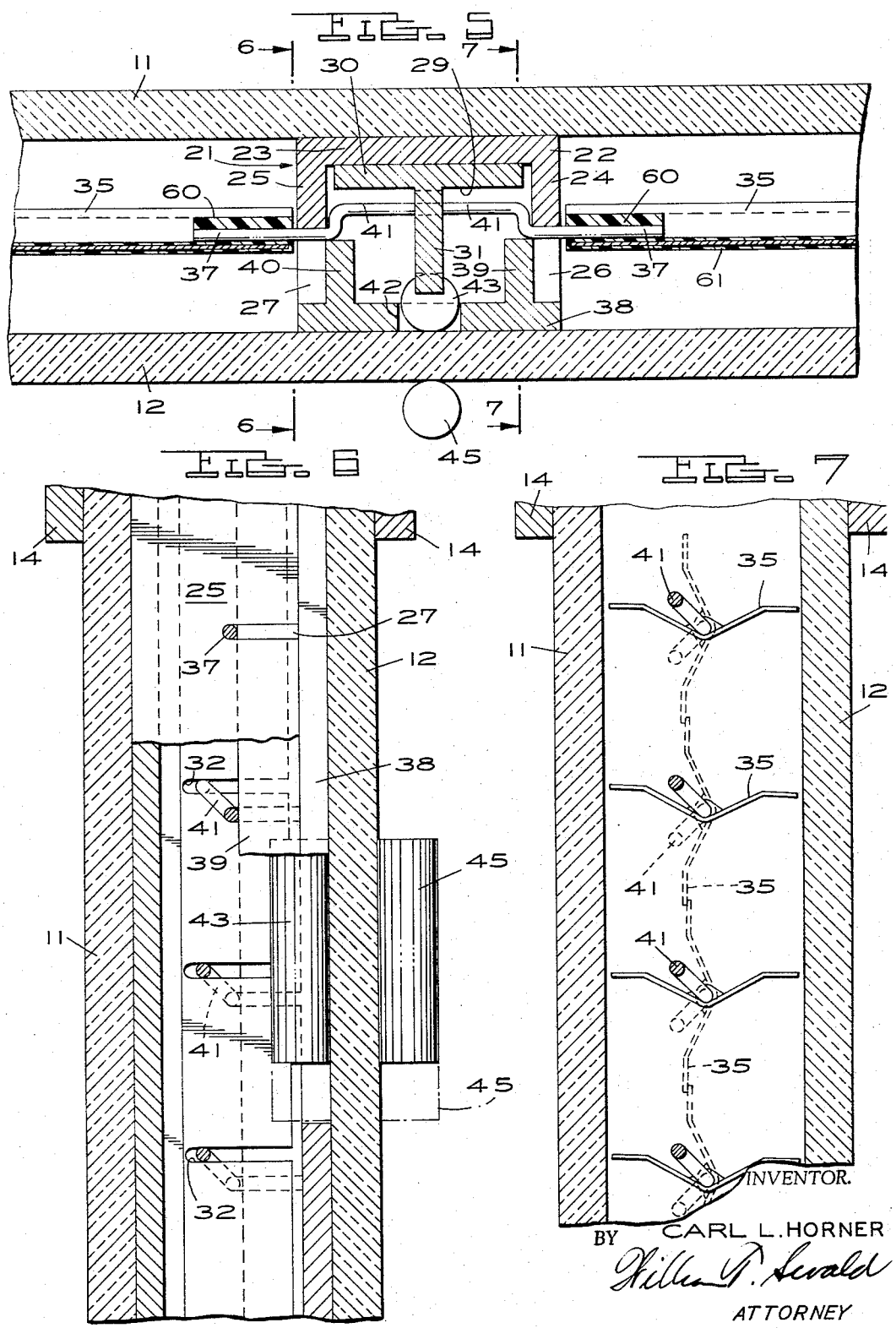
INVENTOR.
CARL L. HORNER
BY William P. Sevald
ATTORNEY

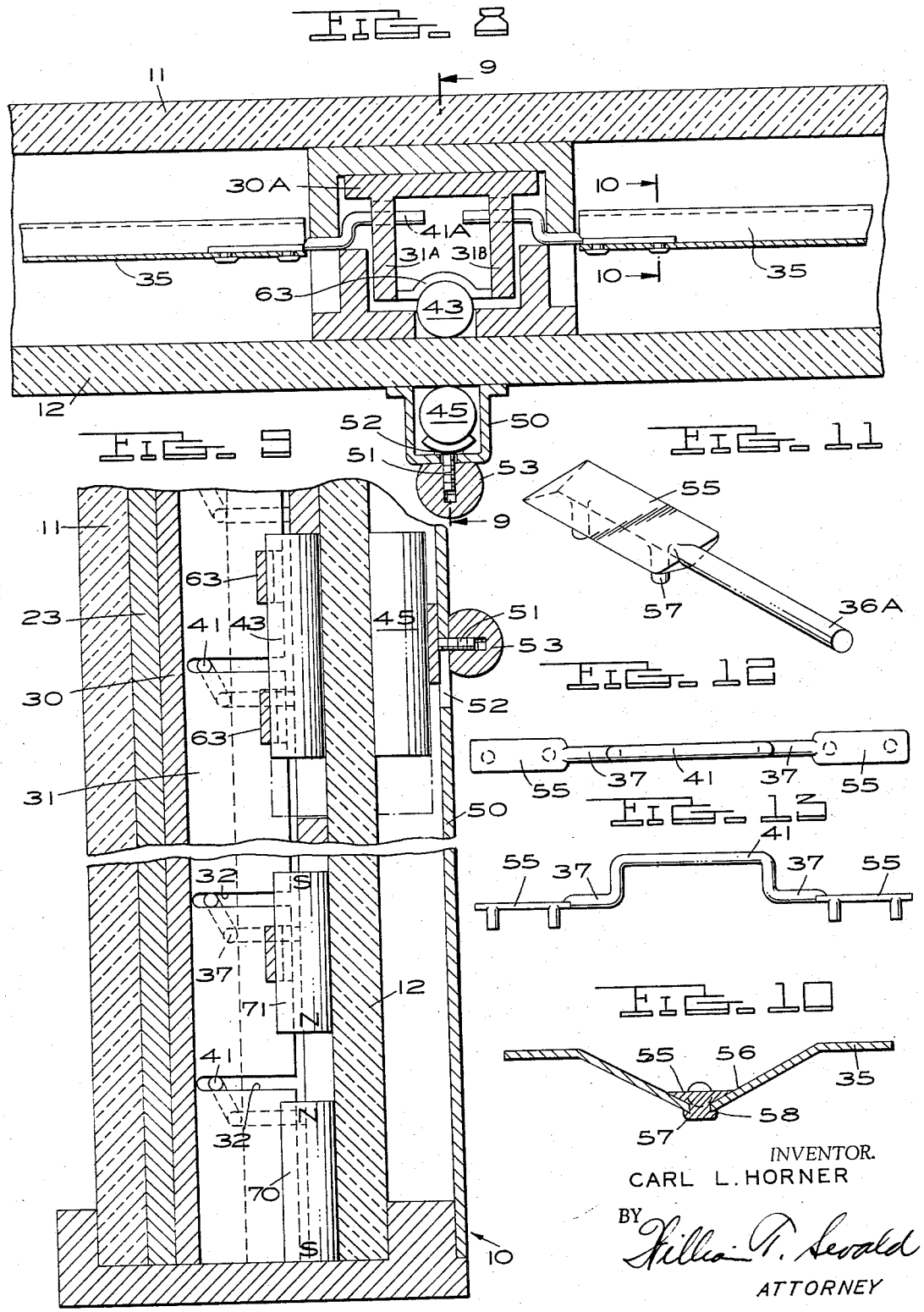

United States Patent Office 3,292,309
Patented Dec. 20, 1966

3,292,309
ADJUSTABLE BLIND ASSEMBLY
Carl L. Horner, Birmingham, Mich., assignor to Therma-louver Corporation, Dearborn, Mich., a corporation of Michigan
Filed May 25, 1964, Ser. No. 369,692
3 Claims. (Cl. 49—64)

This invention relates to a direct sunlight baffle assembly which is adjustable to regulate the angular position of the blind strips for sun control, visibility, and privacy and which is particularly suited for positioning in a sealed glass insulating window unit in the space between the double glass panels.

Sealed glass insulating units of the double glass panel type have been used very successfully to insulate the window area of heated buildings in winter. However, they do not provide suitable insulating characteristics relative to solar heat in summer as the heat rays penetrate into the interior. In a building which is air conditioned, this creates an additional load on the air conditioning equipment.

While prior art curtains, drapes, and venetian blinds may be employed with sealed glass window units to reduce the added heat load of the sun incident to air conditioning in summer, these devices allow the penetration of the heat rays through the sealed unit and then reflect and deflect the sun's rays in the room. Thus the sun heat has penetrated the sealed glass unit so that the load, although baffled, is ultimately transmitted to room air and imposed on the air conditioning system.

In some instances fixed baffle assemblies have been positioned between the glass panels of a sealed thermal insulating unit, however, due to the fact that the fixed baffles cannot be adjusted their maximum benefit cannot be attained as their angular position must be averaged out between reflection, refraction, visibility, and closure for privacy purposes.

With the foregoing in view, the primary object of the invention to provide an adjustable blind assembly between the double glass panels of a sealed window unit so that maximum benefit can be achieved in that the blind strips may be closed for privacy, completely opened for visibility, and adjusted to the best baffle position relative to the ambient angularity of the sun's rays.

An object of the invention is to provide pivotally mounted blind strips between the double glass panels of the window unit which are angularly movable between completely open and closed positions and which are adjustable at angles therebetween.

An object of the invention is to provide novel pivot pin and cranks easily connectable to the blind strips insuring easy manufacture and smooth operation.

An object of the invention is to provide a crank connected to each baffle strip lying in a cam slot of an actuator member so integrated that linear movement of the actuator member swings the cranks 90° to pivot the blind strips between the full open and closed positions.

An object of the invention is to provide an adjustable blind assembly which may be sealed in an insulating window unit and operated from outside the window unit without disturbing the insulating seal of the unit by any suitable means.

An object of the invention is to provide magnet and armature means with one inside the unit and one outside the unit for moving the actuator member linearly to swing the cranks with the magnetic field force of the magnet communicating through one glass panel so that movement of a magnet or armature on the actuator member thereby transmitting movement to the actuator member through a sealed glass panel.

An object of the invention is to provide a magnet on the actuator member and a magnet on the outside of the glass panel adjacent thereto with the magnets communicating with each other through their oppositely disposed north and south poles thereby doubling the strength of the magnetic reaction to insure moving the actuator member to change the angulation of the blind strips.

An object of the invention is to provide means for counteracting gravitational influenced movement and positioning of the actuator member so that the actuator member will maintain an adjusted position when positioned vertically.

An object of the invention is to provide an adjustable baffle assembly for sealed glass units which is simple in design and construction, inexpensive to manufacture, easy to assemble in a sealed glass unit, and easy to operate with the unit installed in a window opening.

These and other objects of the invention will become apparent by reference to the following description of an adjustable blind assembly for a sealed glass window unit by reference to the following description of the adjustable blind assembly embodying the invention taken in connection with the accompanying drawings in which:

FIG. 5 is a greatly enlarged partial view of the central portion of FIG. 2 showing the construction in more detail.

FIG. 6 is a partial cross-sectional view of FIG. 5 taken on the line 6—6 thereof showing the construction in detail.

FIG. 7 is a partial cross-sectional view of FIG. 5 taken on the line 7—7 thereof showing the open position of the blind strips in solid lines and the closed position in dotted lines and showing the swing of the cranks between solid and dotted line positions.

FIG. 8 is a view similar to FIG. 5 showing an alternate construction.

FIG. 9 is a partial cross-sectional view of FIG. 8 taken on the line 9—9 thereof showing the structure in detail and showing gravity counteracting means.

FIG. 10 is an enlarged cross-sectional view of FIG. 8 taken on the line 10—10 thereof showing the pivot pin and blind strip inter-connection of one embodiment.

FIG. 11 is an enlarged perspective view of an end pivot pin.

FIG. 12 is a plan view of a double pin double crank embodiment; and

FIG. 13 is a side elevational view of the device seen in FIG. 12.

Figure 1:
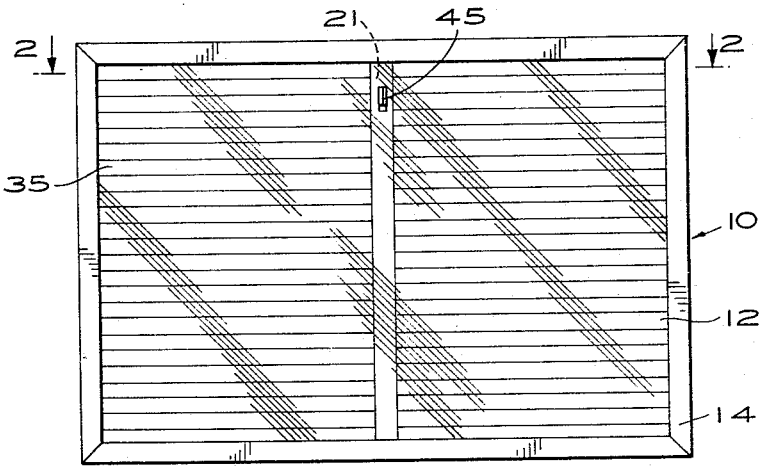
FIG. 1 is an inside elevational view of a sealed glass window unit incorporating the adjustable blind assembly of the invention.

Referring now to the drawings wherein like numerals refer to like and corresponding parts throughout the several views, the adjustable blind assembly disclosed therein sealed in a double glass panel thermal-insulating window unit to illustrate the invention comprises a sealed glass unit 10 having spaced glass panels 11 and 12 and edge sealing means 13.

The edge sealing means 13 may be of any construction and may embody a clamping molding 14, a sealing member 15, a spacer member 16, and hygroscopic material 17. The spacer member 16 may be used as one of the support members for the adjustable blind strips of the invention. However, separate support members 18 may be used within the perview and concept of the invention.

The adjustable blind assembly 20 includes at least one side support member 18 and an actuator assembly 21. The adjustable blind assembly 20 is shown with blind strips on either side of the actuator assembly 21. It will be understood that the assembly 21 can be located adjacent one side of the sealed glass unit 10 with blind strips extending from only one side thereof. Also it must be understood that more than one actuator assembly 21 may be located between the side support members 18 such as in an extremely wide window.

More particularly, FIGS. 5–7, the actuator assembly 21 comprises a channel member 22 which is U-shaped in the cross-section so as to include a web portion 23 and side flanges 24 and 25. Slots 26 and 27 are formed in the side flanges 24 and 25 respectively. The root of the slots 26 constitutes a partial bearing for the pivot pins as hereinafter set forth. Apertures 28 are formed in the side support members 18 and aligned with the slots 26 and 27. The apertures 28 constitute bearings for the pivot pins as hereinafter more fully explained.

An actuator member 30 lies within the channel of the channel member 22. The actuator member 30 includes a base 29 and a stem 31. The stem 31 has cam slots 32 formed therein. The actuator member 30 is linearly movable relative to the channel member 22.

A plurality of blind strips 35 are positioned between the side support members 18 and the channel member 22. Pivot pins 36 fixed on the outer ends of the blind strips 35 lie in the bearing apertures 28 of the side support members 18. Pivot pins 37 fixed to the other end of the blind strips 35 lie in the slots 26 and 27 of the channel member 22. A retainer molding 38 is equipped with ribs 39 and 40 overlying the flanges 24 and 25 respectively of the channel member 22. The ends of the ribs 39 and 40 abut the pivot pins 37 and form part of the pivot pin bearing properly locating the pivot pins 37 in the roots of the slots 26 and 27.

The pivot pins 37 are equipped with cranks 41 which may be inter-connected as shown in FIG. 5 or which may be separate as shown in FIG. 8. The retainer molding 38 is provided with a space 42, and a magnet 43 lies in the space 42. The magnet 43 is attached to the operator member 30 and moves freely in the space 42 of the retainer molding 38.

The cranks 41 are positioned on the blind strips 35 at substantially a 45° angle relative to the mean face plane of the blind strips 35. Thus, in swinging the cranks 41 in a 90° arc, the cranks 41 move from an angular position 45° relative to the vertical plane of the blind strips 35 in their closed vertical position to an angular position 45° relative to the horizontal plane of the blind strips in their open horizontal position. The cranks 41 swing in a 90° arc between the open and closed positions 45° off dead center at both ends relative to the cam slot 32 in the stem 31 of the actuator member 30. Thus it is impossible for the cranks 41 to ever lie at dead center relative to the cam slots 32 in the stem portion 31 of the actuator member 30. This enables the actuator member 30 to move linearly in opposite directions and to cam the cranks 41 through 90° angular movement without approaching dead center relationship.

A magnet 45 lies outside the glass panel 12 opposite the magnet 43 inside the glass panel 12. The north and south poles of the magnet 45 are oppositely disposed relative to the magnet 43. This produces an attraction between the opposite poles of the magnets 43 and 45 creating a magnetic field of substantially double the power of one magnet.

While two magnets 43 and 45 have been shown as illustrative of the preferred embodiment of the invention, it is obvious that the actuator member 30 may be formed of ferrous material and a single magnet used to move it linearly. Also a magnet may be attached to the actuator member 30 and an iron armature used outside the glass panel 12 to move the actuator 30 linearly or vice versa.

The length of the operator member 30 is suited to the length of the channel member 22 so that its linear movement in both directions is limited by abutting the ends or a cross-member at the end of the channel member 22. The linear movement of the actuator member 30 is coordinated to swing the crank through its 90° arc depending on the length of the crank throw.

A housing 50, FIGS. 8 and 9, is provided on the outside of the glass panel 12 enclosing the outer magnet 45. Magnet adjusting means on the housing 50 include a screw 51 attached to the magnet 45 extending through a slot 52 in the housing 50. The screw 51 is in engagement with a thumb nut 53. The nut 53 and screws 51 move and position the outer magnet 45 relative to the inner magnet 43. The inner magnet 43 follows the outer magnet 45 and movement of the inner magnet 43 moves the actuator member 30 linearly.

The pivot pins may be attached to the blind strips 35 as shown in FIGS. 8–13 wherein the pivot pin 36A has an enlarged end 55. The end 55 may be of complementary shape, such as spread V-shaped in cross-section, to interfit with the channel 56 of the blind strip 35. The enlarged end 55 has projections 57 and the blind strip 35 has apertures 58 receiving the projections 57. The projections are peened over the blind strip 35 fixedly interconnecting the pivot pin 36 and the blind strip 35 together.

An alternate form of attaching the pivot pins to the blind strips 35 is shown in FIGS. 2–5 wherein a sleeve member 60 is formed with a slotted sleeve portion 61 enclosing the end of the blind strip 35 and a web portion 62 which encases the pivot pin 37. The sleeve members 60 are preferably injection molded of synthetic resin material with the pivot pins molded in the connector member. Thus in assembling the device the pivot pin may be mounted relative to the blind strips. It is also obvious that the pivot pins may be formed integrally by lancing out of the material of the blind strips or they may be welded or bonded thereto as desired.

Figure 3:
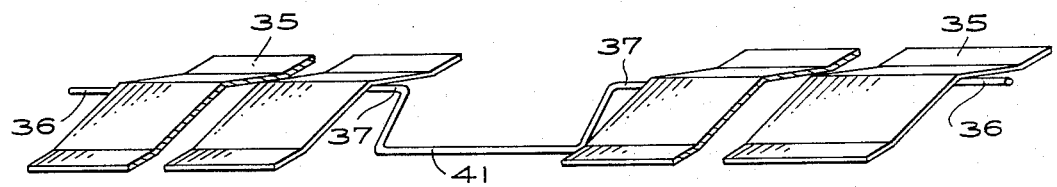
FIG. 3 is an enlarged perspective view, partly broken away, of the blind strips, pivot pins, and inter-connected crank seen in FIGS. 1 and 2.
Figure 2:
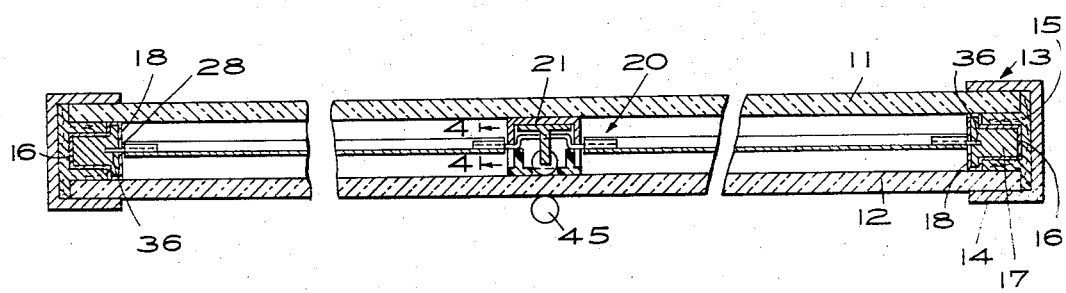
FIG. 2 is an enlarged cross-sectional view, partly broken away, of the device seen in FIG. 1 taken on the line 2—2 thereof.
Figure 4:
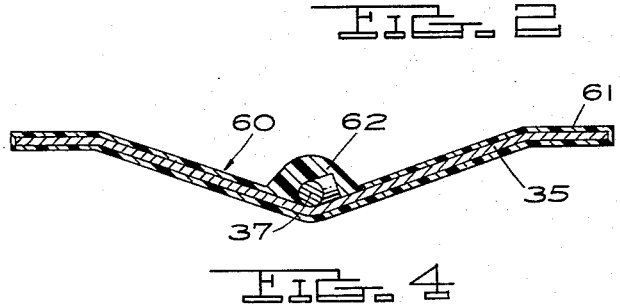
FIG. 4 is a greatly enlarged cross-sectional view of the device seen in FIG. 2 taken on the line 4—4 thereof showing the sleeve member on the end of the blind strip connected to the pivot pin.

The crank 41 may be made single as shown in FIG. 8 or double as shown in FIGS. 2–3 and FIGS. 12–13. The pivot pins 37 at the cranks may be attached to the blind strips as shown in FIGS. 3, 4, and 8 similarly to the outer pivot pins 36.

Referring now to the modifications seen in FIG. 8, it will be observed that the cranks 41A on the aligned blind strips 35 are shown separately formed and not interconnected. Here the actuator member 30A has two stem portions 31A and 31B operating the cranks 41A on either side. Also a strut 63 inter-connects the stems 31A and 31B and provides means for mounting the magnet 43 or an armature in association with the operator member 30A.

Gravity counteracting means are provided to counterbalance the weight of the actuator member 30 when positioned vertically to obviate its effect on the cranks 41–41A so that the adjusted position of the actuator member 30–30A is assured and so that it is easy to operate. A magnet 70 is based on the window unit 10 and a magnet 71 is fixed on the actuator member 30–30A. Their like poles are in opposition and the magnets 70–71 produce a lift on the actuator member 30 by repelling each other.

In assembling a sealed glass unit 10 with the adjustable blind assembly of the invention, the side support members 18 are equipped with the bearing apertures 28. The actuator assembly 21 is positioned and the blind strips 35 are inserted with their pivot pins 36 in the apertures 28 of the support strips 18 and with their pivot pins 37 in the slots 26 and 27 of the channel member 22. The cranks 41 on the pivot pins 37 are located in the cam slots 32 of the actuating member 30. The retainer molding 38 is then placed on the channel member 22 and the other panel of glass, such as the panel 12, is placed on the assembly. The edge sealing means 13 is then positioned around the edge of the glass panels and the assembly is completed.

In operation, the adjustable blind strips 35 can be moved between the solid and the dotted line positions illustrated in FIG. 7 by moving the armature or magnet 45 relative to the armature or magnet 43 whereupon a magnetic reaction occurs causing the magnet 43 to move as the magnet 45 is moved. Thus the user may move the magnet 45 and cause substantially equal movement of the magnet 43. The movement of the magnet 43 is transferred to the actuator member 30, which in turn, moves the cranks 41 angularly as desired to position the blind strips 35 in the solid and dotted line positions illustrated in FIG. 7 or at angular positions therebetween to suit the ambient sun condition, to open the blinds for visability, or to close the blinds for privacy purposes.

The actuator member may be moved linearly to swing the cranks by any suitable means such as the magnets shown and described. However, other suitable means may be used to move the actuator member linearly within the scope of the invention. For example, mechanical means such as a worm and worm gear, a rack and pinion, levers, toggles, etc. may be used. Operating means may lead through the window unit. Also a lead screw and nut may be used and manual or motor power employed such as a reversible electric motor to turn the lead screw.

The novel adjustable blind device provides means adjusting the angle of the blind strips for visibility, privacy, and sun control of sealed glass window units. While only a few embodiments of the invention have been shown and described in detail with some modifications, it is obvious that many changes may be made in the size, detail, shape, and arrangement of the various elements of the invention within the scope of the appended claims.

I claim:

1. Adjustable sun control, view control, and privacy control blind means particularly suitable for installation between the spaced double glass panels of a sealed thermal insulating window unit with said blind means being operable inside the unit from a position outside the window unit to locate the blind means inside the window unit in the desired angular position without disturbing the sealed thermal insulating condition of the unit, comprising spaced parallel support members having aligned bearing means such as apertures, blind strips lying between said support members having opposite ends adjacent said support members, pivotal means such as pivot pins on said opposite ends of said blind strips lying in said bearing means of said support members swingably mounting said blind strips between said support members, cranks on said pivot pins at one said support member, a linearly movable actuator member adjacent said one support member having cam means such as slots engaging said cranks;

linear movement of said actuator member swinging said cranks to swing said blind strips angularly between a position parallel to a line of sight, a position normal to a line of sight, and various adjusted positions between said parallel position and said normal position;

operating means connected to said actuator member for moving said actuator member linearly inside a sealed glass window unit in which said adjustable blind means is contained, an operator assembly associated with said actuator member comprising a channel member U-shaped in cross-section having a web portion and extending flanges;

at least one said flange having slots leading to a root constituting partial bearing means;

said crank pivot pins lying in said slots at said roots of said flanges;

said actuator member lying in said channel member and having a base slidably positioned on said web portion of said channel member and an extending stem lying parallel to said channel member flanges having cam slots engaging said cranks on said pivot pins; and a retainer molding lying on said channel member flanges having at least one extending rib lying parallel to said channel member flanges abutting said crank pivot pins constituting partial bearing means for said pivot pins in cooperation with said partial bearing means of said roots of said slots in said flange of said channel member.

2. In a device as set forth in claim 1 said operator assembly being located intermediate the sides of a window unit;

pivot pins and cranks disposed in both said flanges;

said cranks lying in said cam slots of said actuator member flanges aligned with one another being interconnected such as by being formed integrally with each other.

3. In a device as set forth in claim 1, said operator assembly being located intermediate the side of a window unit, pivot pins and cranks disposed in both said flanges;

said actuator member having two said cam slotted stems with one stem engaging said cranks extending from one said flange and the other said slotted stem engaging said cranks extending from the other said flange of said channel member.

References Cited by the Examiner

UNITED STATES PATENTS

| | | | |
|---|---|---|---|
| 1,515,521 | 11/1924 | Pratt et al. | 189—62 |
| 2,343,813 | 3/1944 | Simon | 160—107 X |
| 2,607,090 | 8/1952 | Chartoff | 20—62 |
| 2,751,154 | 8/1956 | Valtersson et al. | 189—62 X |
| 2,809,826 | 10/1957 | Graham | 189—62 X |
| 2,863,374 | 12/1958 | Hinden | 189—62 X |
| 3,129,471 | 4/1964 | Johnson et al. | 20—56.5 |
| 3,191,241 | 6/1965 | Johnson | 20—62 |

HARRISON R. MOSELEY, *Primary Examiner.*

P. C. KANNAN, *Assistant Examiner.*